United States Patent [19]
Mustread

[11] Patent Number: 6,089,815
[45] Date of Patent: Jul. 18, 2000

[54] BASKET ASSEMBLY FOR WHEEL RIM TRANSFER

[75] Inventor: Larry A. Mustread, Bowling Green, Ky.

[73] Assignee: Hayes Lemmerz International, Inc., Northville, Mich.

[21] Appl. No.: 09/026,998

[22] Filed: Feb. 23, 1998

[51] Int. Cl.[7] .............................. B23Q 3/00; B21H 1/10
[52] U.S. Cl. .................... 414/426; 414/222.01; 269/287; 269/268; 269/43; 269/283; 269/25; 269/303; 29/894.35
[58] Field of Search .................................. 414/426, 222, 414/222.01; 29/894.35, 894.353, 894.354; 269/25, 43, 268, 287, 283, 303; 198/468.2, 773

[56] References Cited

U.S. PATENT DOCUMENTS

| | | | |
|---|---|---|---|
| 2,181,020 | 11/1939 | Le Jeune | 29/894.353 X |
| 2,295,852 | 9/1942 | Le Jeune | 29/894.353 X |
| 2,586,029 | 2/1952 | Greenshields et al. | 29/894.353 X |
| 3,779,060 | 12/1973 | Schroder | 29/894.354 X |
| 3,830,387 | 8/1974 | Virnig | 54/2 R |
| 3,934,324 | 1/1976 | Hess et al. | 29/894.35 |
| 4,279,287 | 7/1981 | Daudi et al. | 152/375 |
| 4,547,945 | 10/1985 | Lawson | 29/407.05 |
| 4,809,529 | 3/1989 | Shinozawa et al. | 29/894.353 |
| 4,985,993 | 1/1991 | Yagi et al. | 29/894.353 |
| 5,212,866 | 5/1993 | Wenzel et al. | 29/894.354 |
| 5,533,261 | 7/1996 | Kemmerer | 29/894.354 |

Primary Examiner—Robert P. Olszewski
Assistant Examiner—Thuy V. Tran
Attorney, Agent, or Firm—MacMillan, Sobanski &Todd, LLC

[57] ABSTRACT

A basket assembly for holding a vehicle wheel rim. The basket assembly includes a basket adapted to hold the wheel rim, and a pair of pads connected to the basket. At least one of the pads is adjustable between a first position, in which the pads do not capture the wheel rim within the basket, and a second position, in which the pads are effective to capture the wheel rim within the basket. The basket assembly is useful in an apparatus for transferring wheel rims between metal forming stations during manufacture of the wheel rims.

14 Claims, 11 Drawing Sheets

BASKET ASSEMBLY FOR WHEEL RIM TRANSFER

BACKGROUND OF THE INVENTION

This invention relates in general to the manufacture of vehicle wheel rims, and in particular to an improved basket assembly for transferring vehicle wheel rims between a series of metal forming operations during manufacture of the wheel rims.

The manufacture of a vehicle wheel rim typically includes the steps of: (a) providing a flat sheet of suitable material, such as aluminum or steel; (b) forming the flat sheet into a cylindrical hoop; (c) flaring the lateral edges of the hoop radially outwardly to produce a rim preform having flanges suitable for positioning on a metal forming machine; and (d) subjecting the rim preform to a series of metal forming operations on the metal forming machine to produce a wheel rim having a predetermined shape.

The metal forming operations are performed at a series of metal forming stations on the metal forming machine. The metal forming machine includes an apparatus for transferring the wheel rims from one metal forming station to the next during the metal forming operations. One type of transfer apparatus includes a transfer beam mounted on a swing arm assembly for rapid movement back and forth in an arc. A plurality of basket assemblies are mounted on top of the transfer beam. The wheel rims are placed into the basket assemblies and transferred from one metal forming station to the next by the movement of the transfer beam. At each metal forming station, the wheel rim is lifted by a mandrel from the basket assembly into engagement with a metal forming tool, and then formed between the tool and the mandrel.

The basket assemblies of the transfer apparatus are usually padded or cushioned to "gently" cradle the wheel rims in the basket assemblies to prevent damage to the wheel rims and to positively hold the wheel rims in the basket assemblies as the wheel rims are moved between the metal forming stations. Typically, the basket assemblies are provided with "fixed" pads which are secured to the basket assemblies by the use of bolts or other removable fasteners. Unfortunately, the use of the fixed pads has several drawbacks. Wheel rims are manufactured in a variety of diameters and widths. Whenever a different sized wheel rim is subjected to the metal forming operations, the fixed pads within the basket assemblies must be changed to different sized pads to accommodate the different size of the wheel rim. Changing the fixed pads is time consuming, resulting in down time on the manufacturing line. Also, it is rather expensive to inventory all the different sized pads needed for the different sized wheel rims. In addition, the fixed pads are not totally effective in holding the wheel rims within the basket assemblies, so that the rapid movement of the transfer beam sometimes causes the wheel rims to fall out of the basket assemblies, resulting in more down time. Thus, it would be desirable to provide an improved basket assembly for transferring vehicle wheel rims between a series of metal forming operations during manufacture of the wheel rims, which is simple and economical.

SUMMARY OF THE INVENTION

This invention relates to an improved basket assembly for holding a vehicle wheel rim. The basket assembly is adjustable between a first position, in which the basket assembly does not capture the wheel rim, and a second position, in which the basket assembly is effective to capture the wheel rim therein. Preferably, the basket assembly includes a basket adapted to hold the wheel rim, and a pair of pads connected to the basket. At least one of the pads is adjustable between a first position, in which the pads do not capture the wheel rim within the basket assembly, and a second position, in which the pads are effective to capture the wheel rim therein. Preferably, the pads engage the outer surface of the wheel rim, and at least one of the pads engages the wheel rim above its centerline to capture the wheel rim within the basket assembly. The basket assembly is useful in an apparatus for transferring vehicle wheel rims between a series of metal forming stations typically used during manufacture of wheel rims.

Various objects and advantages of this invention will become apparent to those skilled in the art from the following detailed description of the preferred embodiment, when read in light of the accompanying drawings.

BRIEF DESCRIPTION OF THE DRAWINGS

FIGS. 11–16 are rear elevational views of a series of metal forming stations, and a transfer apparatus including the improved basket assemblies in accordance with the invention which are operative to transfer the associated vehicle wheel rims between the metal forming stations.

DETAILED DESCRIPTION OF THE PREFERRED EMBODIMENT

Figure 1:
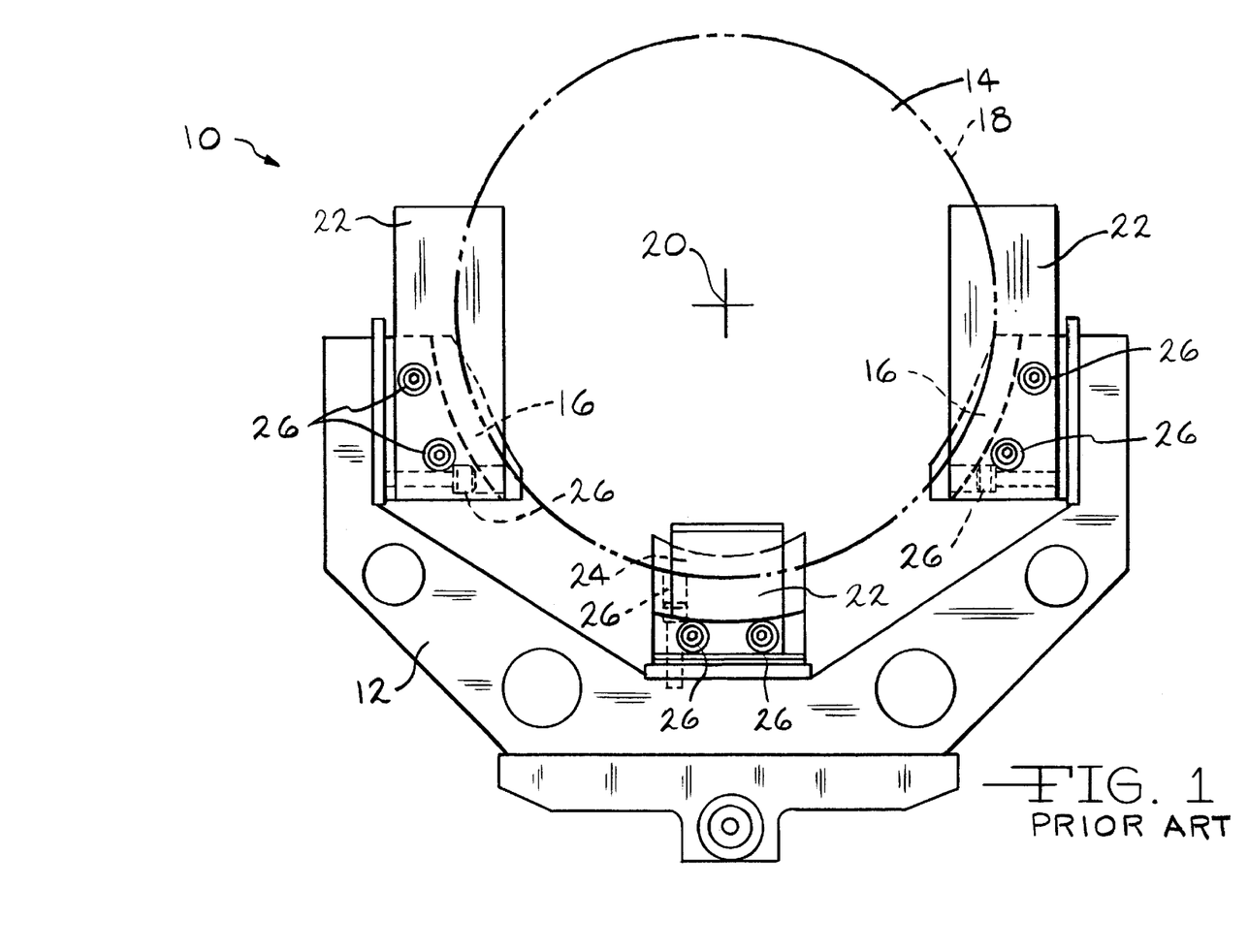
FIG. 1 is a front elevational view of a prior art basket assembly with fixed pads holding a vehicle wheel rim.

Referring now to the drawings, there is illustrated in FIG. 1 a prior art basket assembly 10 which can be used in an apparatus (not shown) for transferring vehicle wheel rims between a series of metal forming stations during manufacture of the wheel rims. The basket assembly 10 includes a basket 12 and a plurality of fixed pads which assist in holding a wheel rim 14 within the basket 12. Specifically, a pair of side pads 16 are fixed to the basket 12 on opposing sides of the wheel rim 14. The side pads 16 engage an outer surface 18 of the wheel rim 14. The wheel rim 14 includes an axis or centerline 20. It can be seen that the side pads 16 engage the outer surface 18 of the wheel rim 14 below the centerline 20 of the wheel rim 14. Consequently, the side pads 16 do not "capture" the wheel rim 14, i.e., the side pads 16 do not prevent the wheel rim 14 from moving up and out of the basket assembly 10. For example, the wheel rim 14 may fall up and out of the basket assembly 10 as a result of the rapid movement of the transfer apparatus. The basket assembly 10 also includes three front pads 22, a back pad (not shown), and a bottom pad 24. The pads 16, 22 and 24 are fixed to the basket 12 by removable bolts 26. When the basket assembly 10 is used for holding a different sized wheel rim, the bolts 26 are unfastened, the original pads 16, 22 and 24 removed and replaced by different sized pads, and the bolts 26 refastened. This changeover process is undesirably time consuming.

Figure 2:
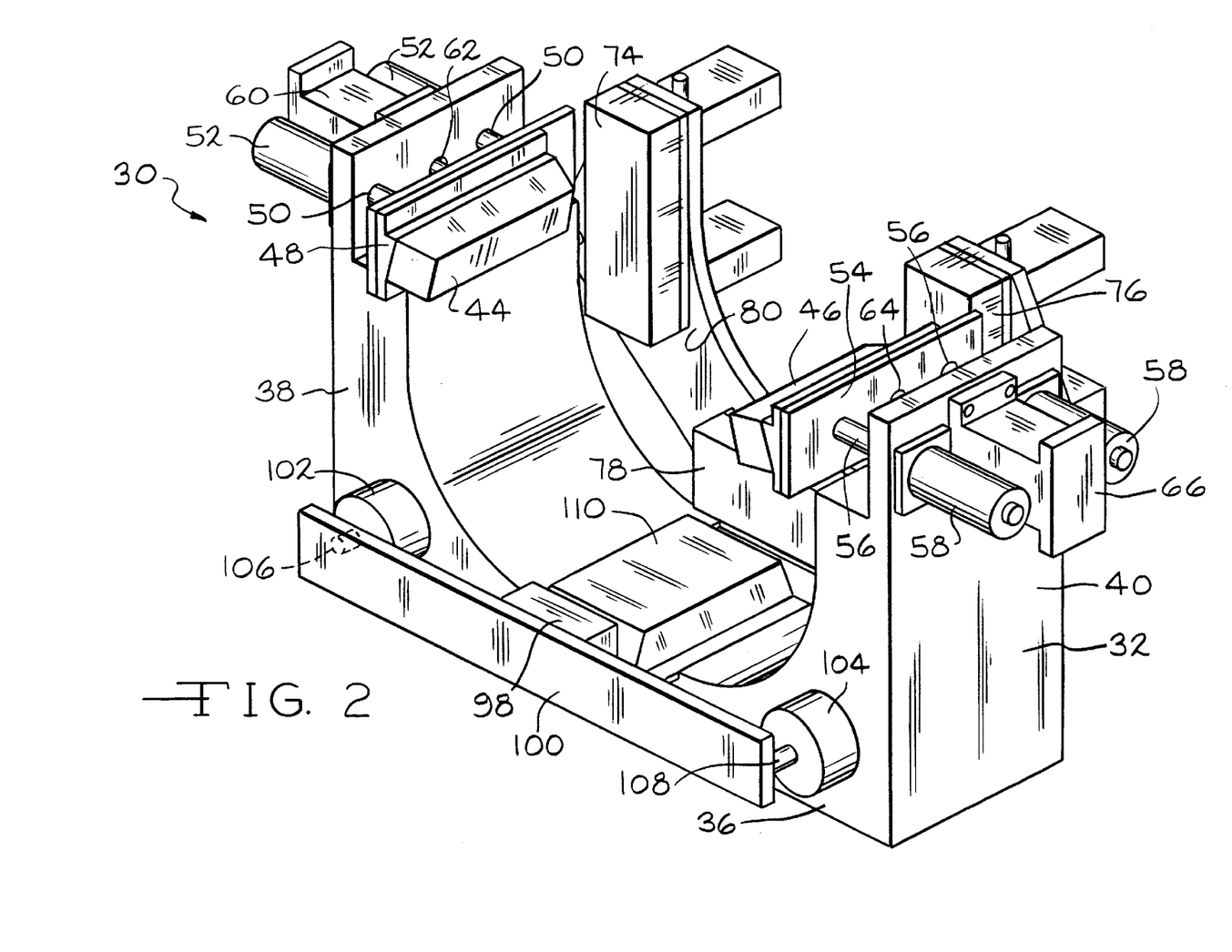
FIG. 2 is a rear perspective view of an improved basket assembly for holding a vehicle wheel rim in accordance with the invention.
Figure 3:
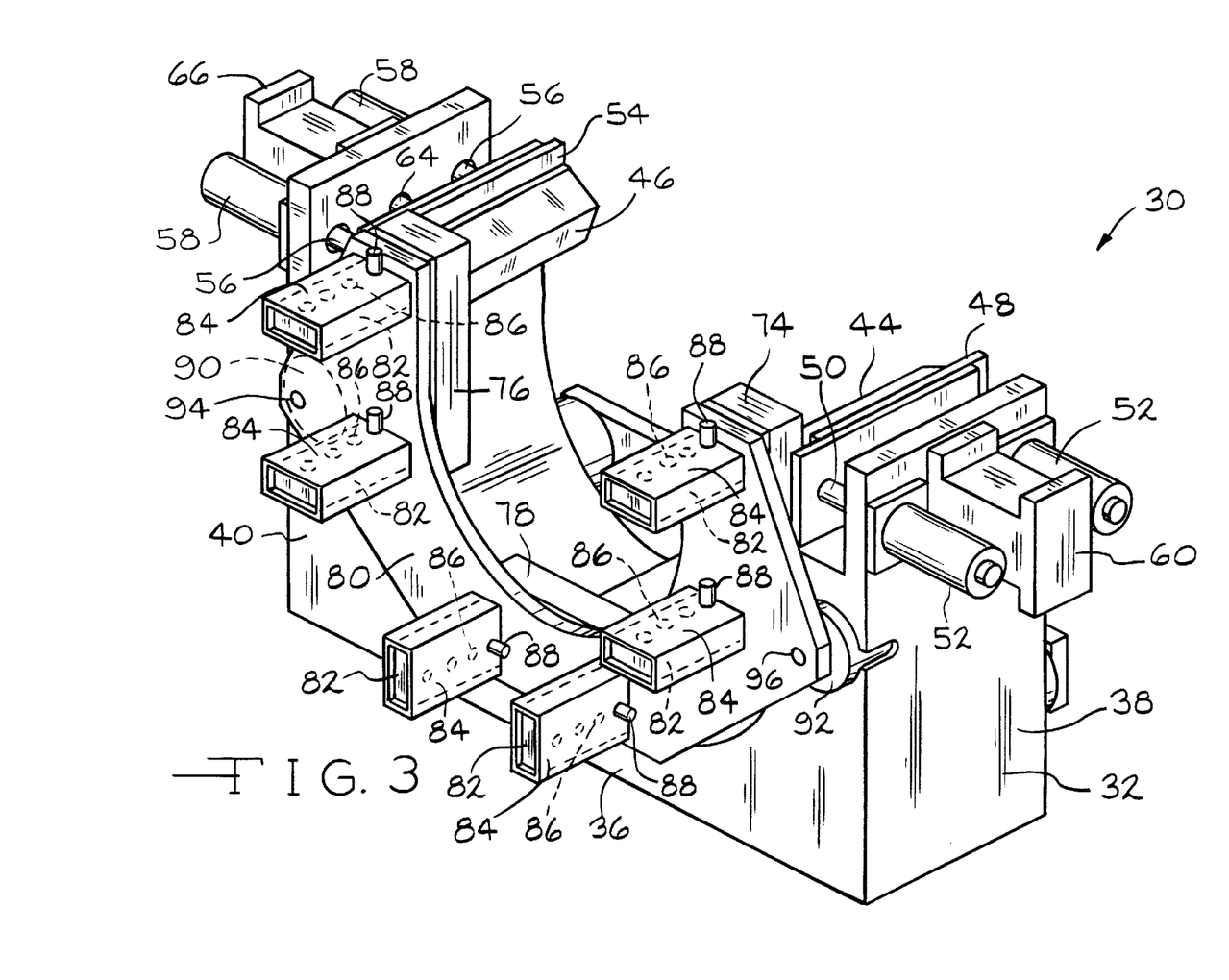
FIG. 3 is a front perspective view of the basket assembly illustrated in FIG. 2.
Figure 4:
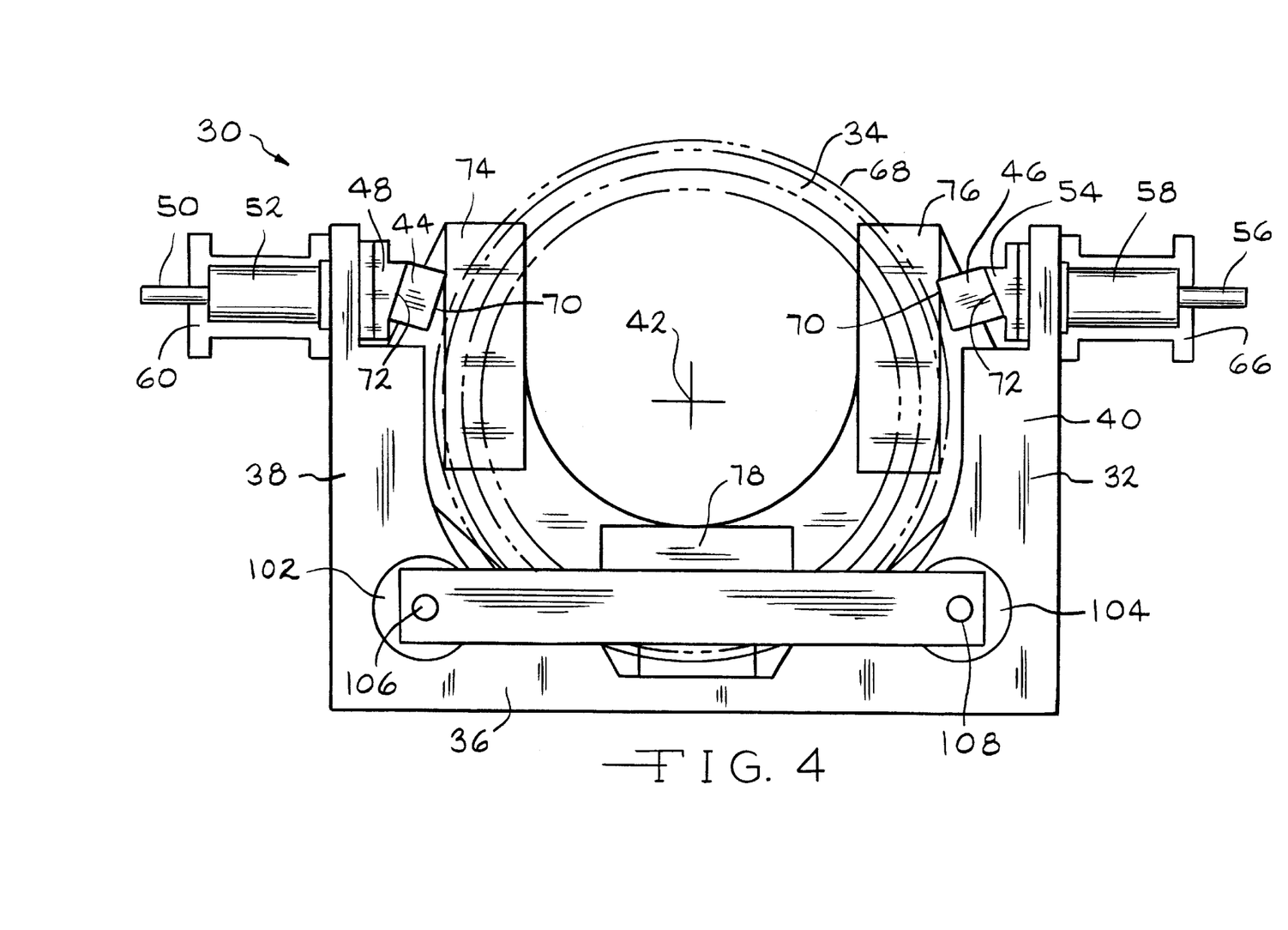
FIG. 4 is a rear elevational view of the basket assembly illustrated in FIG. 2, showing the basket assembly holding a vehicle wheel rim with a pair of side pads in a retracted position.

FIGS. 2–5 illustrate an improved basket assembly 30 in accordance with this invention. The basket assembly 30 includes a basket 32 adapted to hold a vehicle wheel rim 34. The basket 32 is adapted to hold any size of vehicle wheel rim 34, e.g., wheel rims ranging in diameter from 14–17 inches and in width from 4–7 inches. Alternatively, the basket 32 can hold a vehicle wheel rim less than 14 inches in diameter or greater than 17 inches in diameter, or less than 4 inches in width or greater than 7 inches in width. The basket 32 is sized to leave space between the basket 32 and the wheel rim 34 for positioning a plurality of "adjustable" pads (described below). Preferably, the basket 32 is formed as a single block of a metallic material, such as aluminum. The basket 32 is generally U-shaped, including a base 36 and upwardly extending left and right arms 38 and 40. As shown in FIG. 4, the arms 38 and 40 are formed so that they extend upward past the axis or centerline 42 of the wheel rim 34.

The basket assembly 30 includes a pair of adjustable left and right side pads 44 and 46. Preferably, the side pads 44 and 46 and the other pads of the basket assembly 30 are formed of a resilient flexible material such as a flexible synthetic plastic. In the illustrated embodiment, all the pads of the basket assembly 30 are straight; however, one or more of the pads could be profiled or contoured to match the contour of the associated wheel rim. The left and right side pads 44 and 46 are adjustably mounted, respectively, on the upper ends of the left and right arms 38 and 40 of the basket 32. The left side pad 44 is mounted on a left side adjust mount 48, which is attached to the extensible shafts 50 of a pair of linear bearings 52 mounted on the left arm 38. Similarly, the right side pad 46 is mounted on a right side adjust mount 54, which is attached to the extensible shafts 56 of a pair of linear bearings 58 mounted on the right arm 40. The left and right side pads 44 and 46 can slide on the bearings 52 and 58 inward toward the wheel rim 34 and outward away from the wheel rim 34.

Preferably, the side pads 44 and 46 and most of the other pads of the basket assembly 30 are automatically adjustable, such as by pneumatic or hydraulic means, but they can also be manually adjustable. In the illustrated embodiment, the side pads 44 and 46 are adjustable by pneumatically operated cylinders. Specifically, an air cylinder 60 is mounted on the left arm 38 of the basket 32 between the bearings 52. The air cylinder 60 includes an extensible shaft 62 which is attached to the left side adjust mount 48. The air cylinder 60 is attached to a pressurized air supply (not shown) and operates in a well-known manner to extend and retract the shaft 62 and the attached left side adjust mount 48 and left side pad 44. The left side pad 44 can be extended by the air cylinder 60 to move inward toward the wheel rim 34, and retracted by the air cylinder 60 to move outward away from the wheel rim 34. Similarly, the right side adjust mount 54 and right side pad 46 are attached to the extensible shaft 64 of an air cylinder 66 mounted on the right arm 40 of the basket 32. The right side pad 46 can be extended by the air cylinder 66 to move toward the wheel rim 34 and retracted to move away from the wheel rim 34. In this manner, the left and right side pads 44 and 46 are automatically adjustable to accommodate wheel rims having different diameters. Preferably, the air cylinders 60, 66 and bearings 52, 58 allow each of the side pads 44 and 46 to be adjusted inward or outward within a range of about three inches. The side pads 44 and 46 do not have to be changed to different sized pads when different sized wheel rims are roll formed.

Figure 5:
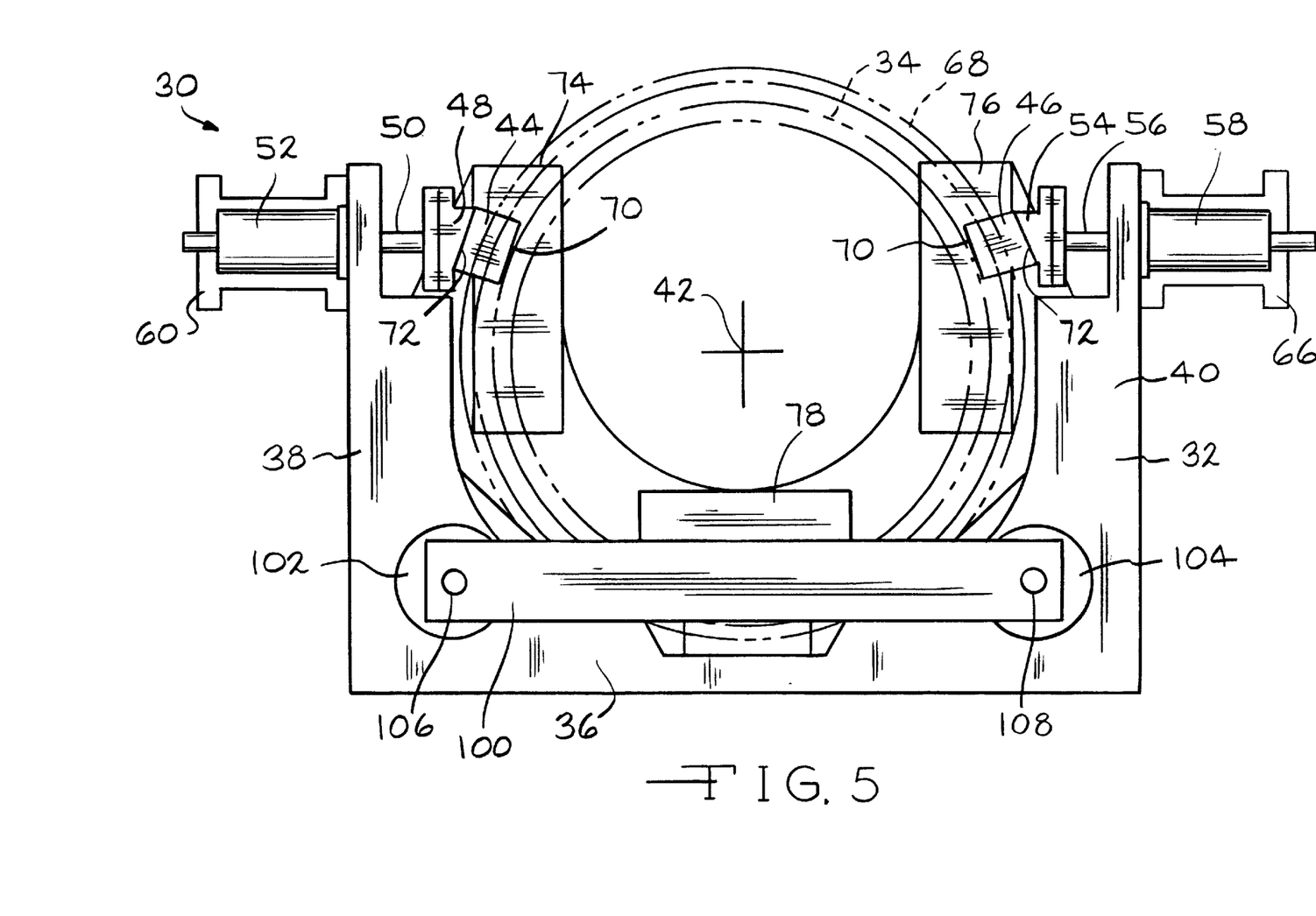
FIG. 5 is a view as in FIG. 4, showing the side pads extended to capture the wheel rim within the basket assembly.

FIG. 4 shows the wheel rim 34 positioned inside the basket 32 and the left and right side pads 44 and 46 in retracted position away from the wheel rim 34. FIG. 5 shows the left and right side pads 44 and 46 extended to engage the outer surface 68 of the wheel rim 34. In contrast to the side pads 16 of the prior art basket assembly 10 shown in FIG. 1, the side pads 44 and 46 engage the outer surface 68 of the wheel rim 34 above the centerline 42 to capture the wheel rim 34 within the basket 32. Preferably, the left and right side pads 44 and 46 have engagement surfaces 70 which are angled downward toward the centerline 42 of the wheel rim 34 to facilitate capturing the wheel rim 34. The angled side pads 44 and 46 push down on the wheel rim 34 so that it is securely engaged and does not come out of the basket 32. The left and right side adjust mounts 48 and 54 have angled surfaces 72 to support the angled side pads 44 and 46.

It should be noted that the adjustability of the side pads 44 and 46 makes it possible for the side pads 44 and 46 to capture the wheel rim 34, i.e., the side pads 44 and 46 can first be retracted to allow insertion of the wheel rim 34 within the basket 32, and then extended to capture the wheel rim 34. The captured wheel rim 34 is prevented from falling out of the basket assembly 30 during rapid movement of the transfer apparatus. This reduces the amount of down time of the metal forming machine, thereby increasing the productivity of the manufacturing process. Capturing the wheel rim 34 also allows the speed of movement of the transfer apparatus to be increased, thereby further increasing productivity.

Referring again to FIGS. 2 and 3, the basket assembly 30 also includes three adjustable front pads: a left front pad 74, a right front pad 76 and a lower front pad 78. The front pads 74, 76 and 78 are adjustably mounted on a front plate 80, which in turn is adjustably mounted on the basket 32. A pair of rectangular rods 82 are attached to each front pad 74, 76 and 78, and extend through apertures (not shown) in the front plate 80 into front pad slide tubes 84 attached to the front of the front plate 80. Each front pad 74, 76 and 78 can be adjusted manually by sliding it inward toward the wheel rim 34 or outward away from the wheel rim 34, with the rods 82 sliding within the front pad slide tubes 84. A plurality of locator holes 86 are formed through each rod 82. After each front pad 74, 76 and 78 has been adjusted to a desired position, its position can be set by inserting a front pad slide pin 88 into the corresponding locator hole 86. Thus, the front pads 74, 76 and 78 are individually adjustable to accommodate wheel rims having different widths and different contours. Preferably, the front pads 74, 76 and 78 can be adjusted inward or outward within a range of about three inches.

The front plate 80 is automatically adjustable by a pair of recessed air cylinders 90 and 92 which are mounted in the arms 38 and 40 of the basket 32. The air cylinders 90 and 92 include extensible shafts 94 and 96 which are attached to the front plate 80. The air cylinders 90 and 92 are attached to a pressurized air supply (not shown) and operate in a well-known manner to extend and retract the shafts 94 and 96 and the attached front plate 80 and front pads 74, 76 and 78. The front plate 80 and front pads 74, 76 and 78 can be extended by the air cylinders 90 and 92 to move inward toward the wheel rim 34 and retracted by the air cylinders 90 and 92 to move outward away from the wheel rim 34. In this manner, the front plate 80 and front pads 74, 76 and 78 are automatically adjustable to accommodate wheel rims having different widths. Preferably, the front plate 80 can be adjusted inward or outward within a range of about one inch.

Figure 6:
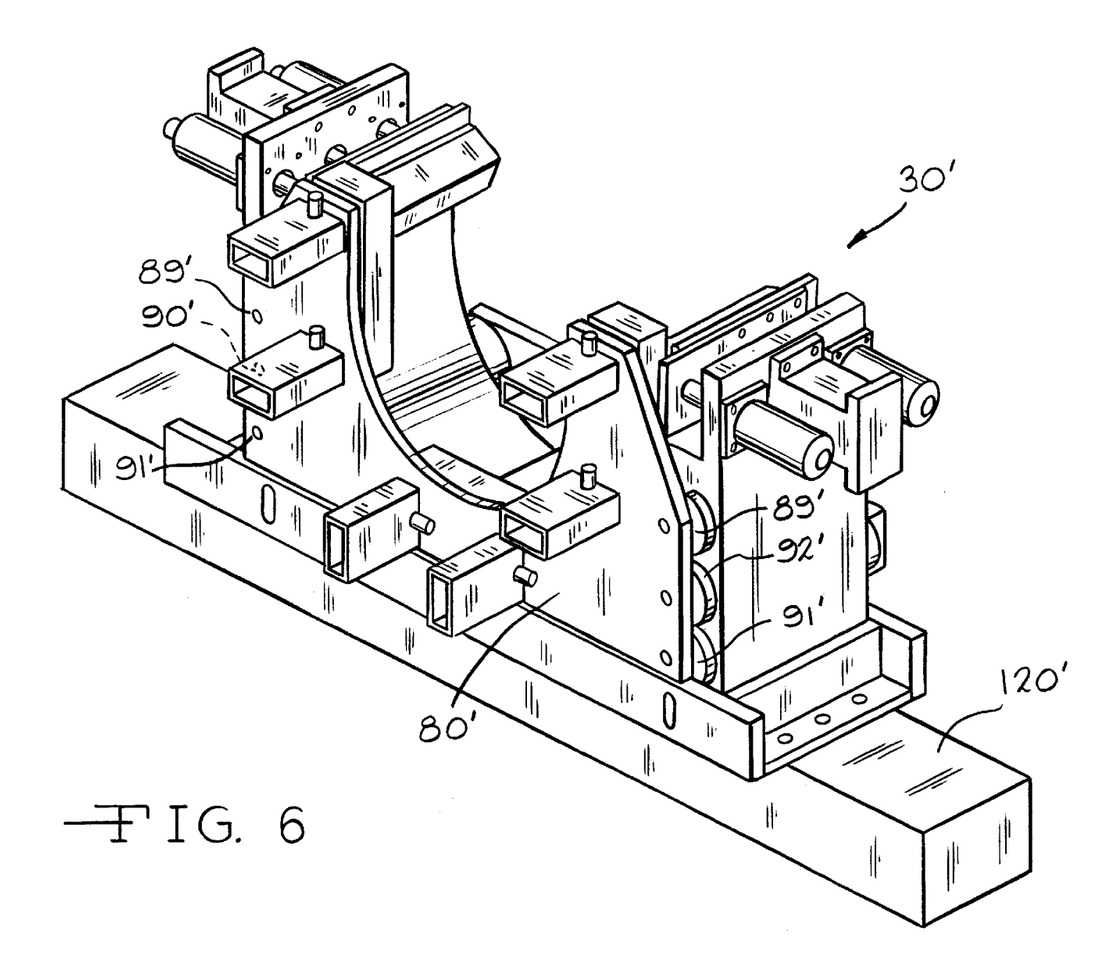
FIG. 6 is a front perspective view of an alternate embodiment of a basket assembly in accordance with the invention.

As shown in FIG. 6, the basket assembly 30' can include additional support for the front plate 80'. The illustrated basket assembly 30' includes a pair of slide bearings is 89' and 91' mounted above and below each of the air cylinders 90' and 92" and attached to the front plate 80'. FIG. 6 also shows the basket assembly 30' mounted on a transfer beam 120', as will be described further below.

Referring again to FIGS. 2 and 3, the basket assembly 30 also includes an adjustable back pad 98. The back pad 98 is mounted on a back plate 100, which in turn is adjustably mounted on the basket 32. The back plate 100 is automatically adjustable by a pair of air cylinders 102 and 104 attached to the left and right ends of the basket 32. The air cylinders 102 and 104 include extensible shafts 106 and 108 which are attached to the ends of the back plate 100. The air cylinders 102 and 104 are attached to a pressurized air supply (not shown) and operate in a well-known manner to extend and retract the shafts 106 and 108 and the attached back plate 100 and back pad 98. The back pad 98 can be extended by the air cylinders 102 and 104 to move inward toward the wheel rim 34 and retracted by the air cylinders 102 and 104 to move outward away from the wheel rim 34. In this manner, the back pad 98 is automatically adjustable to accommodate wheel rims having different widths. Preferably, the back pad 98 can be adjusted inward or outward within a range of about one inch.

The basket assembly 30 further includes an adjustable bottom pad 10. The bottom pad 110 is manually adjustable in a known manner so that it can be extended to move upward toward the wheel rim 34 and retracted to move downward away from the wheel rim 34, to accommodate wheel rims having different diameters. Preferably, the bottom pad 110 can be adjusted within a range of about six inches.

Figure 7:
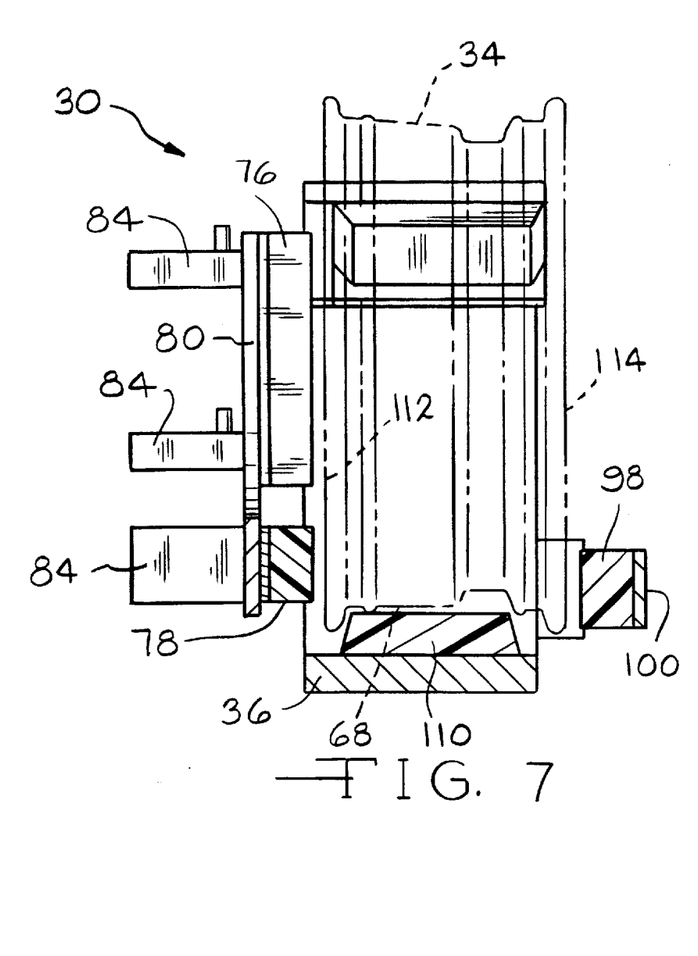
FIG. 7 is a side cross-sectional view of the basket assembly illustrated in FIG. 2, showing the basket assembly holding the vehicle wheel rim with front and back pads in a retracted position.
Figure 8:
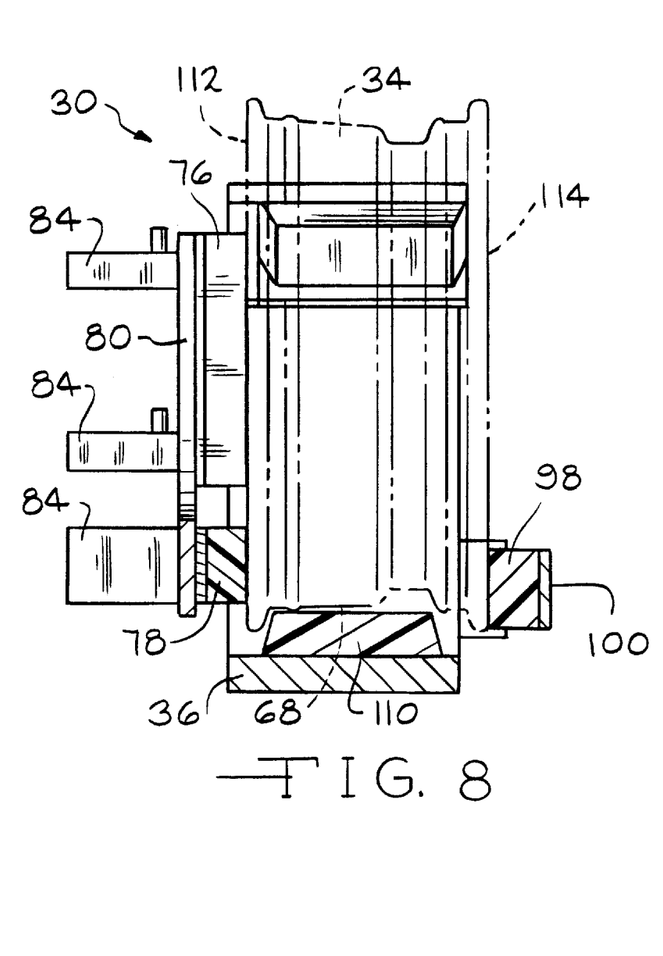
FIG. 8 is a view as in FIG. 7, showing the front and back pads extended to engage the wheel rim.

FIG. 7 shows the wheel rim 34 positioned inside the basket 32. The outer surface 68 of the wheel rim 34 rests on the bottom pad 110. The front pads 76 and 78 and the back pad 98 are in retracted position away from the wheel rim 34. FIG. 8 shows the front pads 76 and 78 and the back pad 98 extended to engage the sides 112 and 114 of the wheel rim 34.

Figure 9:
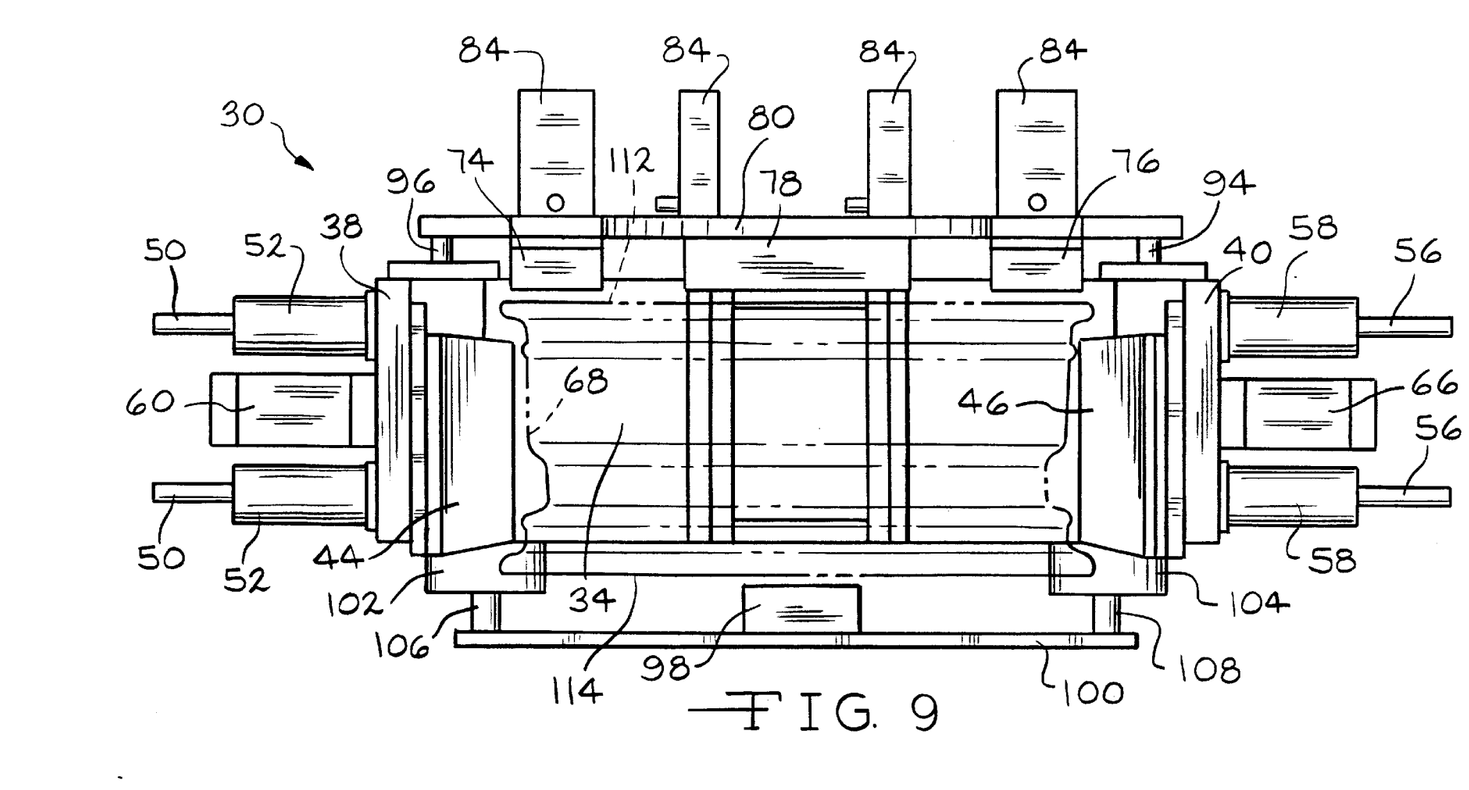
FIG. 9 is a top view of the basket assembly illustrated in FIG. 2, showing the basket assembly holding the vehicle wheel rim with the side pads and the front and back pads in the retracted position.
Figure 10:
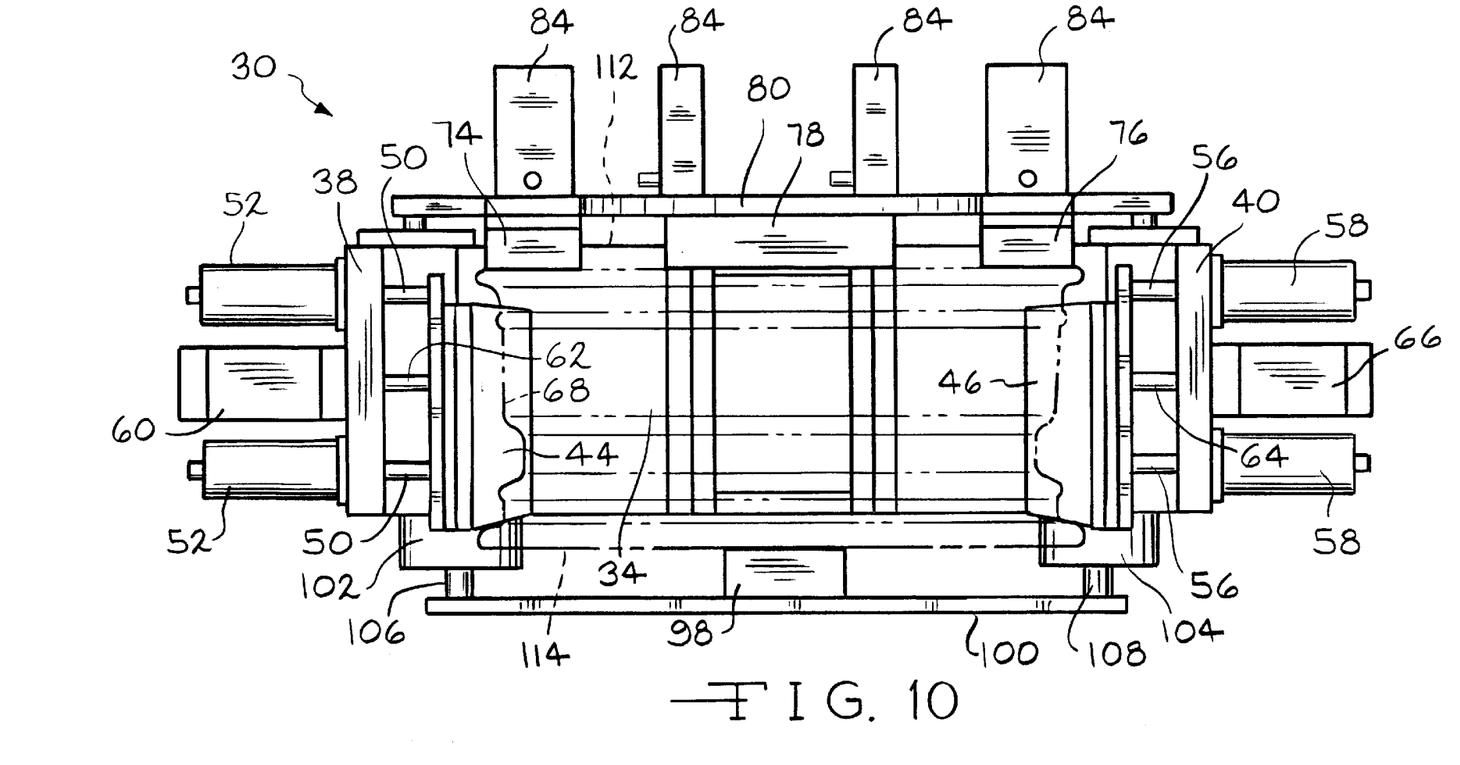
FIG. 10 is a view as in FIG. 9, showing the side pads and the front and back pads extended to capture the wheel rim within the basket assembly.

FIG. 9 shows the wheel rim 34 positioned inside the basket 32, with the left and right side pads 44 and 46, the front pads 74, 76 and 78 and the back pad 98 in retracted position away from the wheel rim 34. FIG. 10 shows the left and right side pads 44 and 46, the front pads 74, 76 and 78 and the back pad 98 extended to engage the outer surface 68 and the sides 112 and 114 of the wheel rim 34. It can be seen that the side pads 44 and 46 engage the outer surface 68 of the rim 34 above the centerline 42 (FIG. 5) to capture the wheel rim 34 within the basket 32. The front pads 74, 76 and 78 and the back pad 98 engage the sides 112 and 114 of the wheel rim 34 to assist in capturing the wheel rim 34. The front pads 74, 76 and 78 and the back pad 98 could also be spaced a short distance from the sides 112 and 114 of the wheel rim 34 while helping to ensure that the wheel rim 34 does not fall out of the basket 32.

In the illustrated embodiment, the front pads 74, 76 and 78 and the back pad 98 do not by themselves capture the wheel rim 34—the wheel rim 34 could still move upward and out of the basket 32 if it was not captured by the side pads 44 and 46. However, the basket assembly 30 could also be constructed so that the front pads 74, 76 and 78 and the back pad 98 cooperate to capture the wheel rim 34 while the side pads 44 and 46 only assist in capturing the wheel rim 34. In general, the basket assembly 30 will work so long as it includes at least a pair of pads, with at least one of the pads being adjustable between a first position in which the pads do not capture the wheel rim, and a second position in which the pads cooperate to capture the wheel rim. Further, when the pads are side pads, the basket assembly 30 will work so long as at least one of the side pads engages the outer surface of the wheel rim above the centerline to capture the wheel rim.

FIGS. 11–16 illustrate a series of metal forming stations S1, S2 and S3, and a transfer apparatus 116 for transferring wheel rims between the metal forming stations in accordance with the invention. The invention is particularly illustrated in terms of a series of roll forming stations in a roll forming operation. However, it is understood that the invention is applicable to any wheel rim metal forming operation, such as, for example, a spin forming operation or a roll spinning operation. U.S. Pat. No. 4,962,587 to Ashley, Jr. et al., issued Oct. 16, 1990, and U.S. Pat. No. 5,579,578 to Ashley, Jr., issued Dec. 3, 1996 (both incorporated by reference) disclose different metal forming operations for wheel rims.

The illustrated transfer apparatus 116 includes four basket assemblies B1, B2, B3 and B4 in accordance with the invention. While any number of basket assemblies can be used, preferably the number of basket assemblies is one more than the number of metal forming stations. The basket assemblies can be any desired size and shape, and each basket assembly can be the same or different from the other basket assemblies. Advantageously, the degree of adjustability of the basket assemblies allows for change in the shape of the wheel rim as it proceeds through the metal forming operations (usually the wheel rim expands in width as it is metal formed).

The transfer apparatus 116 also includes a device 118 for indexing the basket assemblies B1, B2, B3 and B4 between the metal forming stations S1, S2 and S3. In the illustrated embodiment, the indexing device 118 includes a platform or transfer beam 120 on which the basket assemblies B1, B2, B3 and B4 are mounted. The transfer beam 120 is mounted on a pair of swing arm assemblies 122 which are adapted to rapidly swing the transfer beam 120 back and forth in an arc.

Figure 11:
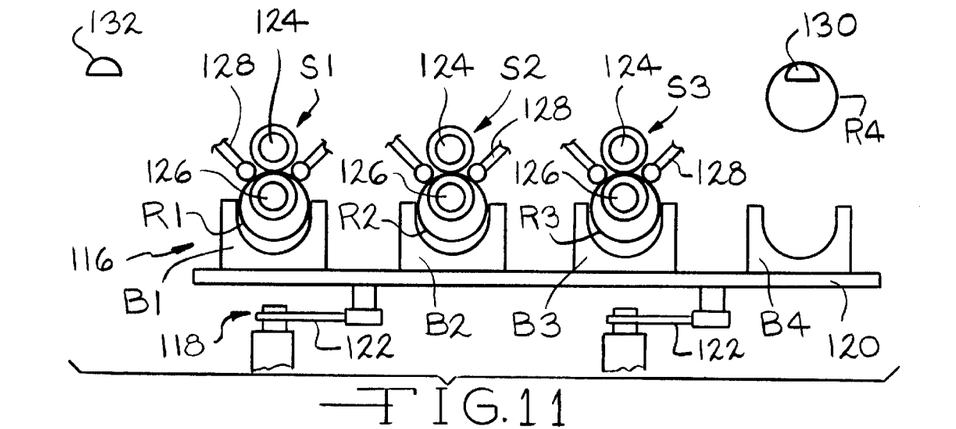
FIG. 11 shows three wheel rims being metal formed and the transfer apparatus with an empty basket assembly positioned to receive a fourth wheel rim.

FIG. 11 shows wheel rims R1, R2 and R3 being metal formed at the metal forming stations S1, S2 and S3. Each metal forming station includes a metal forming tool 124 and a mandrel 126. The wheel rims R1, R2 and R3 are lifted by the mandrels 126 from the basket assemblies B1, B2 and B3 into engagement with the metal forming tools 124, and metal formed between the metal forming tools 124 and the mandrels 126. The wheel rims R1, R2 and R3 are heated by a pair of tailstocks 128 to soften the wheel rims for metal forming. The basket assembly B4 is empty and is positioned to receive a fourth wheel rim R4 (a wheel preform at this stage).

Figure 12:
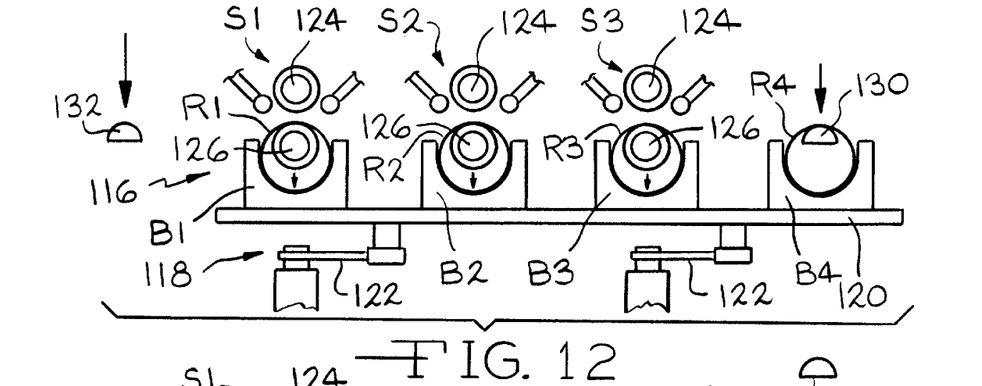
FIG. 12 shows the first three wheel rims lowered into the basket assemblies of the transfer apparatus, and the fourth wheel rim inserted into the empty basket assembly.

FIG. 12 shows the wheel rims R1, R2 and R3 lowered by the mandrels 126 into the basket assemblies B1, B2 and B3. The wheel rim R4 has been lowered by an entry drop rod 130 into the basket assembly B4.

Figure 13:
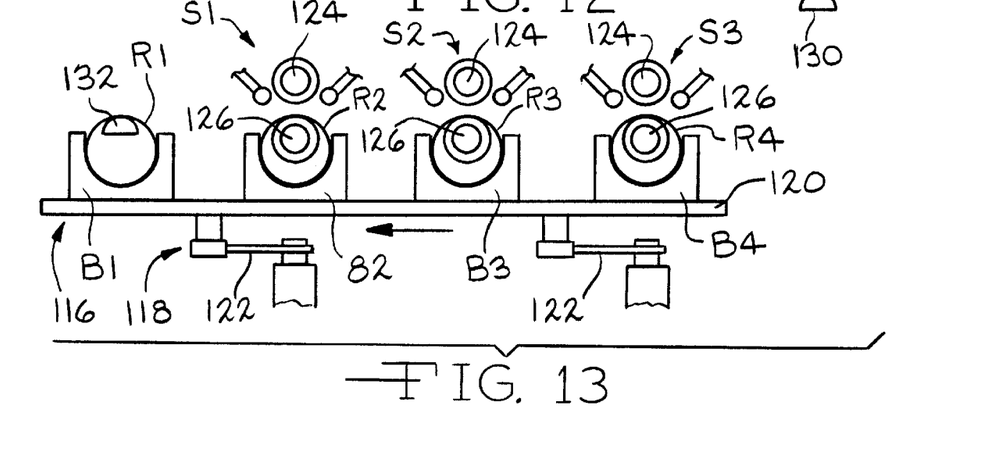
FIG. 13 shows the transfer apparatus moved to the left to transfer the wheel rims between the metal forming stations, with the first wheel rim positioned for removal from the transfer apparatus.

FIG. 13 shows the transfer apparatus 116 swung to the left to transfer the wheel rims R2, R3 and R4 between the metal forming stations S1, S2 and S3. In particular, the wheel rim R2 is now positioned at the metal forming station S1, the wheel rim R3 is positioned at the metal forming station S2, and the new wheel rim R4 is positioned at the first metal forming station S1 to begin the metal forming process. The first wheel rim R1 has been metal formed at all the metal forming stations S1, S2 and S3, and it is now positioned for removal from the transfer apparatus 116.

Figure 14:
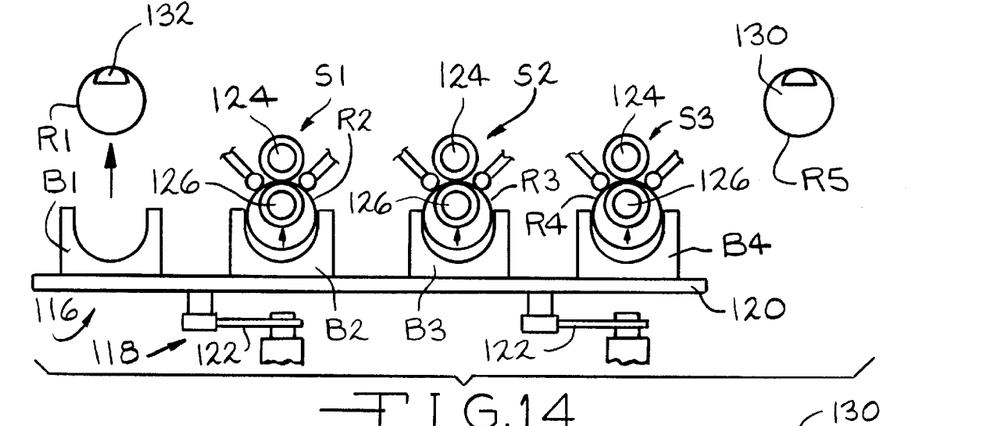
FIG. 14 shows the second through fourth wheel rims raised into a position for metal forming, and the first wheel rim removed from the transfer apparatus.

FIG. 14 shows wheel rim R1 removed from the transfer apparatus 116 by an exit lift rod 132. The wheel rims R2, R3 and R4 have been lifted by the mandrels 126 for metal forming at the metal forming stations S1, S2 and S3.

Figure 15:
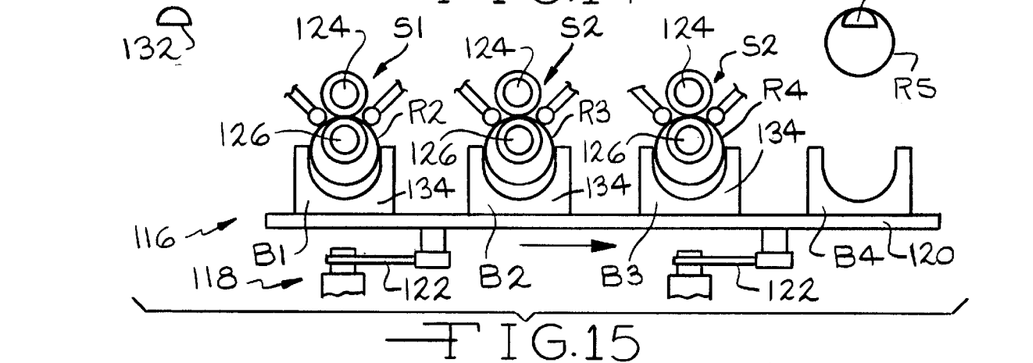
FIG. 15 shows the transfer apparatus moved to the right with an empty basket assembly positioned to receive a fifth wheel rim.

FIG. 15 shows the transfer apparatus 116 swung to the right. It should be noted that the back side 134 of each of the basket assemblies B1, B2, B3 and B4 is mostly open, obstructed only by the back plate 100 (FIG. 1) which is positioned low on the basket assembly. Consequently, the basket assemblies are not obstructed by the lifted wheel rims R2, R3 and R4 when the transfer apparatus 116 swings in an arc to the right. The transfer apparatus 116 can include proximity switches and solenoid valves (not shown) that sense when the wheel rims are lifted up and lowered so that the movement of the transfer apparatus 116 is coordinated with the movement of the wheel rims. Timers can also be used for this purpose. In FIG. 15, the wheel rim R2 is now positioned above the basket assembly B1, the wheel rim R3 is positioned above the basket assembly B2, and the wheel rim R4 is positioned above the basket assembly B3. The basket assembly B4 is empty and is positioned to receive a fifth wheel rim R5.

Figure 16:
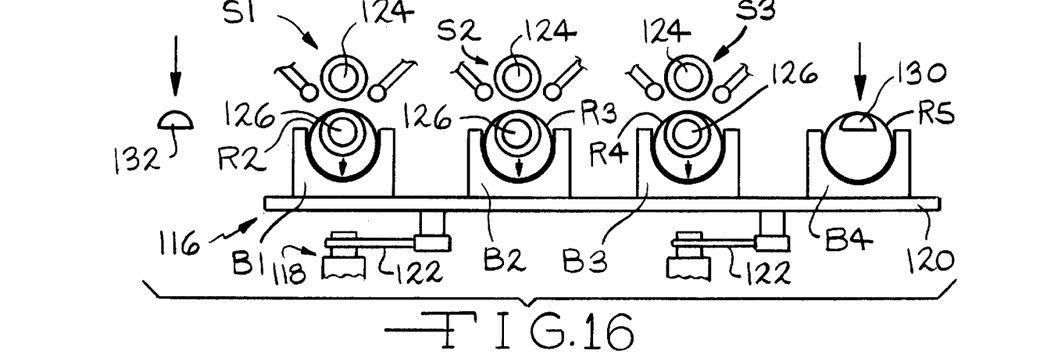
FIG. 16 shows the second through fourth wheel rims lowered into the basket assemblies of the transfer apparatus, and the fifth wheel rim inserted into the empty basket assembly.

FIG. 16 shows the wheel rims R2, R3 and R4 lowered by the mandrels 126 into the basket assemblies B1, B2 and B3. The new wheel rim R5 has been lowered by the entry drop rod 130 into the basket assembly B4 and is ready to begin the metal forming operations.

While this invention has been illustrated and described in connection with the specific wheel rim 34 disclosed herein, it is understood that the invention is applicable to any type of wheel rim, such as a partial wheel rim or a full face wheel rim. Also, the wheel rims can be formed of any suitable material, such as, for example, steel alloy or aluminum alloy.

In accordance with the provisions of the patent statutes, the principle and mode of operation of this invention have been explained and illustrated in its preferred embodiment. However, it must be understood that this invention may be practiced is otherwise than as specifically explained and illustrated without departing from its spirit or scope.

What is claimed is:

1. A combination basket assembly for transferring a vehicle wheel rim between a series of metal forming stations during which the vehicle wheel rim is processed to a desired shape, the combination basket assembly and vehicle wheel rim comprising:

a wheel rim defining a centerline and including an outer surface and an inner surface; and a basket assembly adapted to hold the vehicle wheel rim during the transferring of the vehicle wheel rim between the series of metal forming stations, said basket assembly including at least a first pair of generally resilient flexible pads connected thereto, at least one of said first pair of pads being adjustable between a first position, in which said one of said first pair of pads does not capture said wheel rim within said basket assembly, and a second position, in which said one of said first pair of pads is effective to capture said wheel rim within said basket assembly, said one of said first pair of pads including at least a portion thereof which extends past said centerline of said wheel rim so as to capture said wheel rim above said centerline.

2. The combination basket assembly and vehicle wheel rim defined in claim 1 wherein said first pair of pads engage said outer surface of said wheel rim to capture said wheel rim within said basket assembly.

3. The combination basket assembly and vehicle wheel rim defined in claim 1 wherein both of said first pair of pads engage said wheel rim above said centerline.

4. The combination basket assembly and vehicle wheel rim defined in claim 1 wherein both of said first pair of pads are adjustable between said first position and said second position.

5. The combination basket assembly and vehicle wheel rim defined in claim 1 further including a second pair of pads connected to said basket assembly, at least one of said second pair of pads being adjustable between a first position, in which said one of said second pair of pads does not capture said wheel rim within said basket assembly, and a second position, in which said one of said second pair of pads is effective to capture said wheel rim within said basket assembly.

6. The combination basket assembly and vehicle wheel rim defined in claim 1 wherein said first pair of pads are positioned on opposed sides of said wheel rim and said second pair of pads are positioned in the front and the back of said wheel rim.

7. The combination basket assembly and vehicle wheel rim defined in claim 6 further including three front pads.

8. The combination basket assembly and vehicle wheel rim defined in claim 1 wherein said basket assembly further includes a generally resilient flexible bottom pad.

9. A basket assembly adapted to transfer a vehicle wheel rim between a series of metal forming stations during which the vehicle wheel rim is processed to a desired shape, the basket assembly comprising:

a basket;

a pair of generally resilient flexible side pads carried by said basket, at least one of said side pads being adjustable between a first position, in which said one of said side pads is adapted not to capture the wheel rim within the basket assembly, and a second position, in which said one of said side pads is adapted to capture the wheel rim within the basket assembly, said one of said side pads including at least a portion thereof which extends past a centerline of the wheel rim so as to capture the wheel rim above its centerline when in said second position; and at least one generally resilient flexible front and rear pads carried by said basket, at least one of said front and rear pads being adjustable between a first position, in which said one of said front and rear pads is adapted not to capture the wheel rim within the basket assembly, and a second position, in which said one of said front and rear pads is adapted to capture the wheel rim within the basket assembly.

10. The basket assembly defined in claim 9 wherein both of said side pads are adjustable between said first position and said second position.

11. The basket assembly defined in claim 9 wherein both of said front and rear pads are adjustable between said first position and said second position.

12. The basket assembly defined in claim 9 wherein both of said side pads are adjustable between said first position and said second position, and both of said front are rear pads are adjustable between said first position and said second position.

13. The basket assembly defined in claim 9 wherein said basket assembly further includes three front pads.

14. The basket assembly defined in claim 9 wherein said basket assembly further includes a generally resilient flexible bottom pad.

* * * * *